Patented June 3, 1952

2,599,291

UNITED STATES PATENT OFFICE 2,599,291

CARBAMYLBENZENE STIBONIC ACIDS

Norbert Steiger, Nutley, N. J., assignor to Hoffmann-La Roche Inc., Roche Park, Nutley, N. J., a corporation of New Jersey No Drawing. Application June 3, 1950, Serial No. 166,057

6 Claims. (Cl. 260—447)

This invention relates to para lower hydroxyalkylcarbamylbenzene stibonic acids and meta and para lower hydroxyalkylaminoalkylcarbamylbenzene stibonic acids and the salts thereof, in which the alkyl group in the hydroxyalkylcarbamyl radicals and the alkyl groups in the hydroxyalkylaminoalkylcarbamyl radical contain at least two carbon atoms. Illustrative of the lower hydroxyalkylcarbamyl and lower hydroxyalkylaminoalkylcarbamyl radicals are $\beta$-hydroxyethylcarbamyl, $\gamma$-hydroxypropylcarbamyl, $\beta$-($\beta$-hydroxyethylamino)ethylcarbamyl, and the like. Some of the new acids combine with one molecule of water to form the corresponding monohydrates.

The new acids are water-insoluble but readily form soluble salts with bases in aqueous media. The resulting aqueous salt solutions are stable, and can be ampulled and heat sterilized for parenteral use. The new compounds are useful in the field of fungicides.

The new lower hydroxyalkylcarbamylbenzene stibonic acids and lower hydroxyalkylaminoalkylcarbamylbenzene stibonic acids can be prepared by diazotizing a para-amino-N-(lower hydroxyalkyl)benzamide or a meta- or para-amino-N-(lower hydroxyalkylaminoalkyl)benzamide in which the alkyl groups contain at least two carbon atoms, and reacting the resulting diazonium compound with an antimonite, for example, sodium antimonite. The starting materials can be prepared by reacting a nitrobenzoyl chloride with a lower hydroxyalkylamine or a lower hydroxyalkylaminoalkylamine to form the corresponding nitro-N-(lower hydroxyalkyl and lower hydroxyalkylaminoalkyl)-benzamides, and reducing the latter to form the corresponding amino-N-(lower hydroxyalkyl and lower hydroxyalkylaminoalkyl)benzamides, as described in my application Ser. No. 143,150, filed February 8, 1950, now Patent No. 2,551,647, from which the following examples are taken.

EXAMPLE A

*p-Amino-N-[$\beta$-($\beta$-hydroxyethylamino)ethyl]-benzamide*

To 400 cc. of water, 125 grams of $\beta$-($\beta$-aminoethylamino)ethanol and 60 grams of sodium carbonate there was added 186 grams of p-nitrobenzoylchloride while stirring at 75–90° C. The stirring was continued for 4 hours at 90° C. after which the reaction mixture was diluted with 1000 cc. of water. Upon standing for 16 hours, crystals of p-nitro-N-[$\beta$-($\beta$-hydroxyethylamino)-ethyl]-benzamide were formed. The crystals were filtered off and washed with three 100 cc. portions of ice water.

240 grams of iron filings, 700 cc. of water and 10 cc. of acetic acid were refluxed for 30 minutes and the prepared p-nitro-N-[$\beta$-($\beta$-hydroxyethylamino)ethyl]benzamide was added thereto at 90–100° C. together with 150 cc. of water. The mixture was refluxed for 4 hours and 55 cc. of a 20% solution of sodium carbonate and 300 cc. of water added thereto at 90° C. 10 grams of a filter aid were added, the mixture was refluxed and then filtered at 95–100° C. The filter cake was washed with 500 cc. of boiling water, and the filtrate treated with 350 grams of sodium chloride and stirred. The p-amino-N-[$\beta$-($\beta$-hydroxyethylamino)ethyl]benzamide crystallized, M. P. 167–169° C.

EXAMPLE B

*m-Amino-N-[$\beta$-($\beta$-hydroxyethylamino)ethyl]-benzamide*

To 400 cc. of water, 125 grams of $\beta$-($\beta$-aminoethylamino)ethanol, and 60 grams of sodium carbonate there were added 186 grams of m-nitrobenzoylchloride with stirring at 75–90° C. The stirring was continued for 4 hours at 90° C. after which 1000 cc. of water were added to the reaction mixture. Upon standing for 16 hours, crystals of m-nitro-N-[$\beta$-($\beta$-hydroxyethylamino)-ethyl]benzamide were formed. They were filtered and washed with three 100 cc. portions of ice water. 230 grams of iron filings, 10 cc. of acetic acid and 500 cc. of water were refluxed for 30 minutes and then there was added thereto the above prepared m-nitro-N-[$\beta$-($\beta$-hydroxyethylamino)-ethyl]benzamide and 150 cc. of water. The mixture was refluxed for 4 hours, and 55 cc. of 20% sodium carbonate and 300 cc. of water added thereto at 95–97° C. 10 grams of a filter aid were added, the mixture was refluxed, and then filtered at 95–100° C. The filter cake was washed with 500 cc. of boiling water and to the filtrate were added 350 grams of sodium chloride. The m-amino-N-[$\beta$-($\beta$-hydroxyethylamino)ethyl]benzamide was obtained as a viscous oil.

EXAMPLE C

*4-amino-N-(3-hydroxypropyl)benzamide*

To 400 cc. of water, 67 grams of 3-amino-propanol and 70 grams of sodium carbonate there were added 170 grams of p-nitrobenzoylchloride. The mixture was stirred for 2 hours at 90° C., then 400 cc. of a 30% solution of sodium chloride were added and the medium cooled to 15° C. The mixture was then filtered to recover the 4-nitro-N - (3 - hydroxypropyl)benzamide which had formed. The compound was washed with three 150 cc. portions of 30% sodium chloride solution. 250 grams of iron filings, 10 cc. of acetic acid and 2 cc. of concentrated (36.5%) hydrochloric acid were refluxed for one hour and then there was added thereto the above prepared 4-nitro-N-(3-hydroxypropyl)benzamide and 150 cc. of water at 95–100° C. The mixture was refluxed for 4 hours, made alkaline with 16 grams of sodium carbonate and filtered hot. The filtrate was concentrated in vacuo and treated with 300 cc. of 30% sodium chloride solution, whereupon 4-amino-N-(3-hydroxypropyl)benzamide separated out as a viscous oil.

The following examples will illustrate the method of preparing the new carbamylbenzene stibonic acid compounds.

EXAMPLE 1

19 grams of 4-amino-N-(2-hydroxyethyl)benzamide were dissolved in dilute hydrochloric acid made up of 25 cc. of concentrated (36%) hydrochloric acid and 125 cc. of water. The resulting solution was chilled to 0° C. and diazotized at 0° to +5° C. with a solution made up of 7 grams of sodium nitrite and 35 cc. of water. The clear diazo solution was dropped into a slurry consisting of 24 grams of antimony trioxide, 60 cc. of 40% sodium hydroxide, 64 grams of glycerol, 150 cc. of water and 1 gram of copper-powder, while agitated at +15 to +25° C. The reaction mixture was then stirred for 4 hours at room temperature and neutralized with dilute hydrochloric acid made up of 20 cc. of 36% hydrochloric acid and 20 cc. of water. Carbon dioxide was then passed into the reaction mixture until a pH of 7.5 was reached. The reaction mixture was filtered, the filtrate was acidified with hydrochloric acid to congo, whereupon 4-($\beta$-hydroxyethylcarbamyl)-benzene stibonic acid precipitated. The precipitate was filtered off and was added to a mixture made up of 250 cc. of water and 18 grams of calcium carbonate powder. The resulting mixture was stirred for two hours and then filtered from excess calcium carbonate. The filtrate was a solution of the calcium salt of 4-($\beta$-hydroxyethylcarbamyl)benzene stibonic acid. The filtrate was acidified with hydrochloric acid whereupon 4-($\beta$-hydroxyethylcarbamyl)benzene stibonic acid was obtained as a tan colored powder after filtration and drying in vacuo. The compound was combined with one molecule of water. It is readily soluble in dilute aqueous diethanolamine solution. Thus, 3 grams of the stibonic acid were dissolved in 30 cc. of a 5% aqueous diethanolamine solution and 50 cc. of water at 50° C. The resulting solution was filtered and the filtrate diluted to 100 cc. This gave a stable 3% solution of the diethanolamine salt of 4-($\beta$-hydroxyethylcarbamyl)benzene stibonic acid which could be ampulled and heat sterilized.

EXAMPLE 2

78 grams of p-amino-N-[$\beta$-($\beta$-hydroxyethylamino)ethyl]benzamide were dissolved in 105 cc. of concentrated (36%) hydrochloric acid and 600 cc. of water. The resulting solution was diazotized with a solution of 30 grams of sodium nitrite in 160 cc. of water at 0° to +5° C. The clear diazo solution was slowly added at +15° to +23° C. with stirring to a mixture of 70 grams of antimony trioxide, 130 cc. of sodium hydroxide (40% by volume), 130 grams of glycerin and 300 cc. of water. The reaction mixture was stirred for 5 hours at room temperature and carbon dioxide was introduced until the pH reached 7.5. The reaction mixture was then filtered and the filtrate was acidified to congo with hydrochloric acid. The 4 - [$\beta$ - ($\beta$-hydroxyethylamino) ethylcarbamyl]benzene stibonic acid was obtained as a white precipitate. It was filtered, washed with water, and dried in vacuo at 50° C., yielding a light cream colored powder. The compound obtained was combined with one molecule of water.

A stable 2% aqueous solution of the diethanolamine salt of 4-[$\beta$-($\beta$-hydroxyethylamino)ethylcarbamyl]benzene stibonic acid was prepared as follows:

2 grams of the acid were added to 60 cc. of water and 10 cc. of an aqueous 10% diethanolamine solution. The mixture was heated to 85–95° C. until solution occurred. 2 cc. of 5% acetic acid were added to neutralize the excess of diethanolamine. The resulting solution was filtered and the filtrate diluted to 100 cc. It could be ampulled and heat sterilized.

EXAMPLE 3

23 grams of m-amino-N-[$\beta$-($\beta$-hydroxyethylamino)ethyl]benzamide were dissolved in 150 cc. of water and 35 cc. of 36% hydrochloric acid. The resulting solution was chilled to 0° C. and diazotized at 0° C. with a solution made up of 8 grams of sodium nitrite and 60 cc. of water. The clear diazo solution was dropped into a mixture made up of 16 grams of antimony trioxide, 1 gram of copper-powder, 50 cc. of 40% sodium hydroxide, 32 grams of glycerol and 150 cc. of water at +15° to +25° C. The reaction mixture was stirred for about 5 hours at room temperature, then saturated with carbon dioxide until the pH of the reaction mixture was 7.5. The mixture was then filtered and the filtrate acidified with hydrochloric acid to congo. The 3-[$\beta$-($\beta$-hydroxyethylamino)ethylcarbamyl]benzene stibonic acid was obtained as a white precipitate. It was filtered, washed with cold water, and dried in vacuo at 40–50° C.

One gram of 3-[$\beta$-($\beta$-hydroxyethylamino)ethylcarbamyl]benzene stibonic acid, 5 cc. of 10% aqueous diethanolamine solution and 30 cc. of water were heated to solution at 80° C., and 2 cc. of 5% acetic acid added thereto. The resulting solution was filtered and the filtrate diluted to 50 cc. yielding a stable 2% solution of the diethanolamine salt of 3-[$\beta$-($\beta$-hydroxyethylamino)ethylcarbamyl]benzene stibonic acid. The solution could be ampulled and heat sterilized.

EXAMPLE 4

38 grams of 4-amino-N-(3-hydroxypropyl)benzamide were dissolved in 800 cc. of water and 50 cc. of 36% hydrochloric acid. The resulting solution was chilled to −5° C., and then diazotized with a solution made up of 14 grams of sodium nitrite and 70 cc. of water at −5° C. to +3° C. The clear diazo solution was added slowly with agitation to a mixture made up of 35 grams of antimony trioxide, 65 grams of glycerol, 75 cc. of 40% sodium hydroxide and 150 cc. of water at between +15° C. to +25° C.

The reaction mixture was stirred for 4 hours at room temperature and then saturated with carbon dioxide until the pH was 5.5. The reaction mixture was then filtered and the filtrate acidified to congo with hydrochloric acid. The 4-(3-hydroxypropylcarbamyl)benzene stibonic acid was obtained as a white precipitate. It was filtered and dried in vacuo yielding a cream color powder. A 3% solution of diethanolamine salt of 4-(3-hydroxypropylcarbamyl)benzene stibonic acid was prepared as follows:

3 grams of 4-(3-hydroxypropylcarbamyl)benzene stibonic acid, 7 cc. of 10% aqueous diethanolamine, and 60 cc. of water were heated to solution at 60° C. 2 cc. of 5% acetic acid were added and the solution filtered and diluted to 100 cc. The solution could be ampulled and heat sterilized.

Other bases, such as diethylamine, ammonium hydroxide, sodium carbonate, potassium carbonate, and the like, can be employed to produce aqueous solutions of the corresponding diethylamine, ammonium, sodium and potassium salts of the 4-(β-hydroxyethylcarbamyl)benzene stibonic acid, 4 - [β - (β-hydroxyethylamino)ethylcarbamyl]benzene stibonic acid, 3-[β-(β-hydroxyethylamino)ethylcarbamyl]benzene stibonic acid, and 4-(3-hydroxypropylcarbamyl)benzene stibonic acid.

I claim:

1. A compound selected from the group consisting of para lower hydroxyalkylcarbamylbenzene stibonic acids and meta and para lower hydroxyalkylaminoalkylcarbamylbenzene stibonic acids in which the alkyl group contains at least two carbon atoms, the monhydrates thereof, and the salts thereof.

2. 4-(β-hydroxyethylcarbamyl)benzene stibonic acid monohydrate.

3. 4-[β - (β - hydroxyethylamino)ethylcarbamyl]benzene stibonic acid.

4. 4-[β - (β - hydroxyethylamino)ethylcarbamyl]benzene stibonic acid monohydrate.

5. The diethanolamine salt of 4-(β-hydroxyethylcarbamyl)benzene stibonic acid.

6. The diethanolamine salt of 4-[β-(β-hydroxyethylamino)ethylcarbamyl]benzene stibonic acid.

NORBERT STEIGER.

REFERENCES CITED

The following references are of record in the file of this patent:

UNITED STATES PATENTS

| Number | Name | Date |
| --- | --- | --- |
| 1,988,632 | Schmidt | Jan. 22, 1935 |

OTHER REFERENCES

Christiansin, "Organic Derivatives of Antimony," The Chemical Catalog Co., Inc., New York city, 1925, pages 55–59.

Chem. Ab., vol. 42, 1948, page 6124$^f$.